United States Patent [19]
Bagnara et al.

[11] Patent Number: 6,113,007
[45] Date of Patent: Sep. 5, 2000

[54] AUTOMATED VEHICLE WASHING SYSTEMS USING CONCENTRATED DETERGENTS

[75] Inventors: Thomas J. Bagnara, Crown Point, Ind.; Thomas J. Gibney, Naperville, Ill.

[73] Assignee: Turtle Wax, Inc., Chicago, Ill.

[21] Appl. No.: 09/158,696

[22] Filed: Sep. 22, 1998

Related U.S. Application Data

[63] Continuation-in-part of application No. 08/909,241, Aug. 11, 1997, Pat. No. 5,884,840, which is a continuation-in-part of application No. 08/296,775, Aug. 26, 1994, Pat. No. 5,655,713.

[51] Int. Cl.[7] ..................................................... B05B 7/30
[52] U.S. Cl. ......................... 239/310; 239/340; 134/99.2; 134/100.1; 134/123
[58] Field of Search ............................. 239/10, 124, 127, 239/127.3, 310, 318, 340, 352, 284.1; 134/99.2, 100.1, 123; 251/903, 332; 210/198.1

[56] References Cited

U.S. PATENT DOCUMENTS

| | | | |
|---|---|---|---|
| 2,606,068 | 8/1952 | Bonacor | 134/123 |
| 2,740,414 | 3/1956 | Moskow | 134/123 |
| 2,788,009 | 4/1957 | Lones | 134/123 |
| 2,827,913 | 3/1958 | Wagner | 134/123 |
| 3,011,501 | 12/1961 | Beranek | 134/123 |
| 3,400,725 | 9/1968 | Miller et al. | 134/123 |
| 3,433,417 | 3/1969 | Poppitz | 134/123 |
| 3,447,505 | 6/1969 | Wagner | 134/123 |
| 3,464,631 | 9/1969 | Lieffring et al. | 239/310 |
| 3,801,017 | 4/1974 | Jarzynski | 239/310 |
| 4,238,073 | 12/1980 | Liska | 239/127 |
| 4,382,552 | 5/1983 | Lubsen et al. | 239/317 |
| 4,383,935 | 5/1983 | Hull | 134/123 |
| 4,522,789 | 6/1985 | Kelly et al. | 422/133 |
| 4,585,168 | 4/1986 | Even et al. | 239/74 |
| 4,715,391 | 12/1987 | Scheller | 134/57 |
| 4,848,384 | 7/1989 | Christoper et al. | 134/57 |
| 5,098,023 | 3/1992 | Burke | 239/273 |
| 5,498,329 | 3/1996 | Lamminen et al. | 134/123 |
| 5,655,713 | 8/1997 | Gibney et al. | 239/310 |

*Primary Examiner*—Andres Kashnikow
*Assistant Examiner*—Jorge Bocanegra
*Attorney, Agent, or Firm*—Baker & McKenzie

[57] ABSTRACT

Retrofit systems are provided to convert existing automated vehicle washing systems from using conventional car wash chemicals to highly concentrated chemicals. The retrofit systems enable a car wash operator to control the feed volume of concentrated chemicals that are fed to a spray arch where the chemicals are mixed with water before being sprayed on a vehicle. The system provided enables the operators of existing car washes to convert from conventional chemicals to highly concentrated chemicals without purchasing an excessive amount of new equipment or carrying out extensive modifications of existing equipment. A novel feature of the present invention includes the use of a pre-dilution block or a double-tip metering assembly for controlling the volume of highly concentrated chemicals delivered to the spray arch of the car wash where the chemicals are diluted with water before being applied to a vehicle.

19 Claims, 6 Drawing Sheets

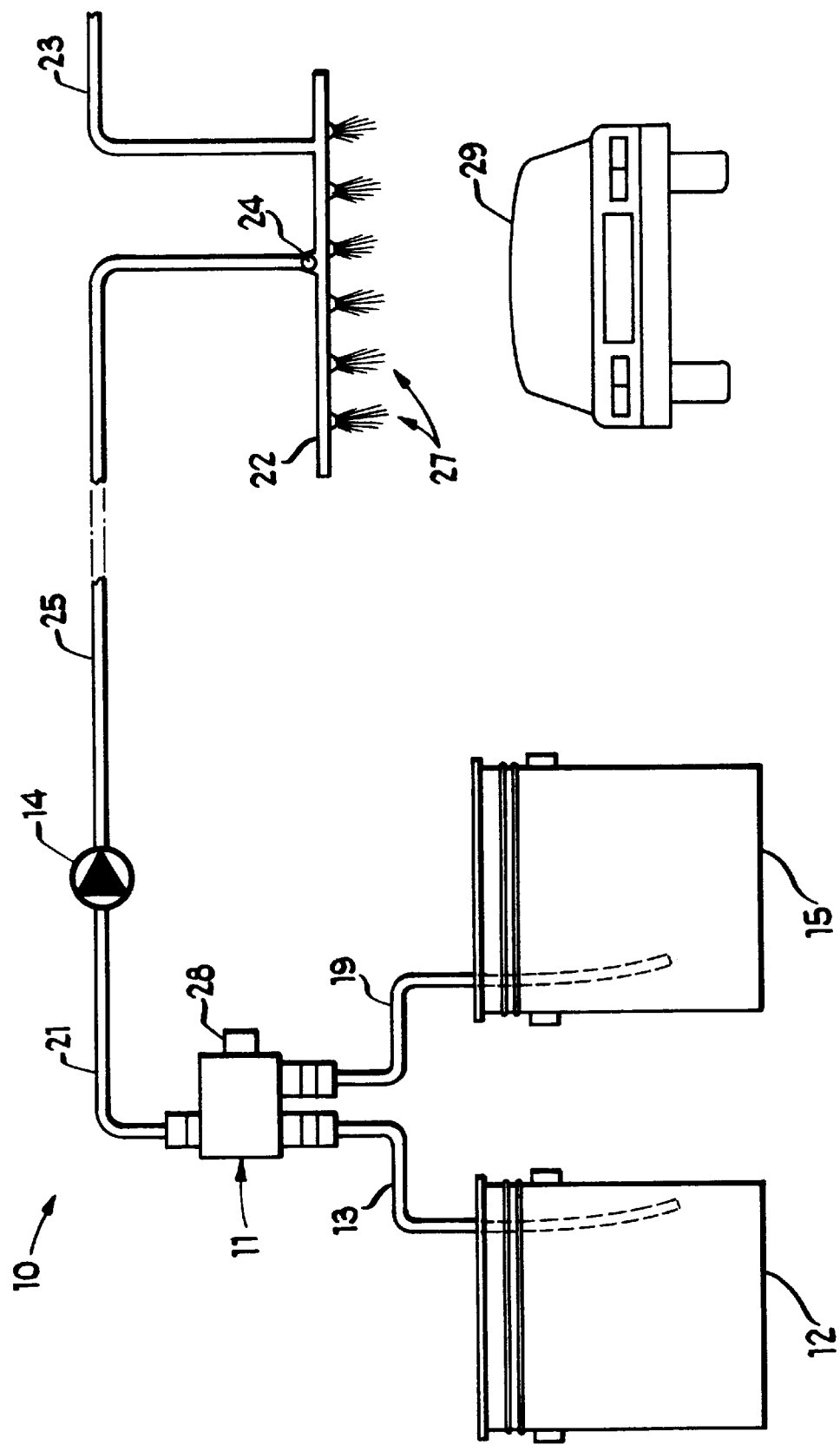

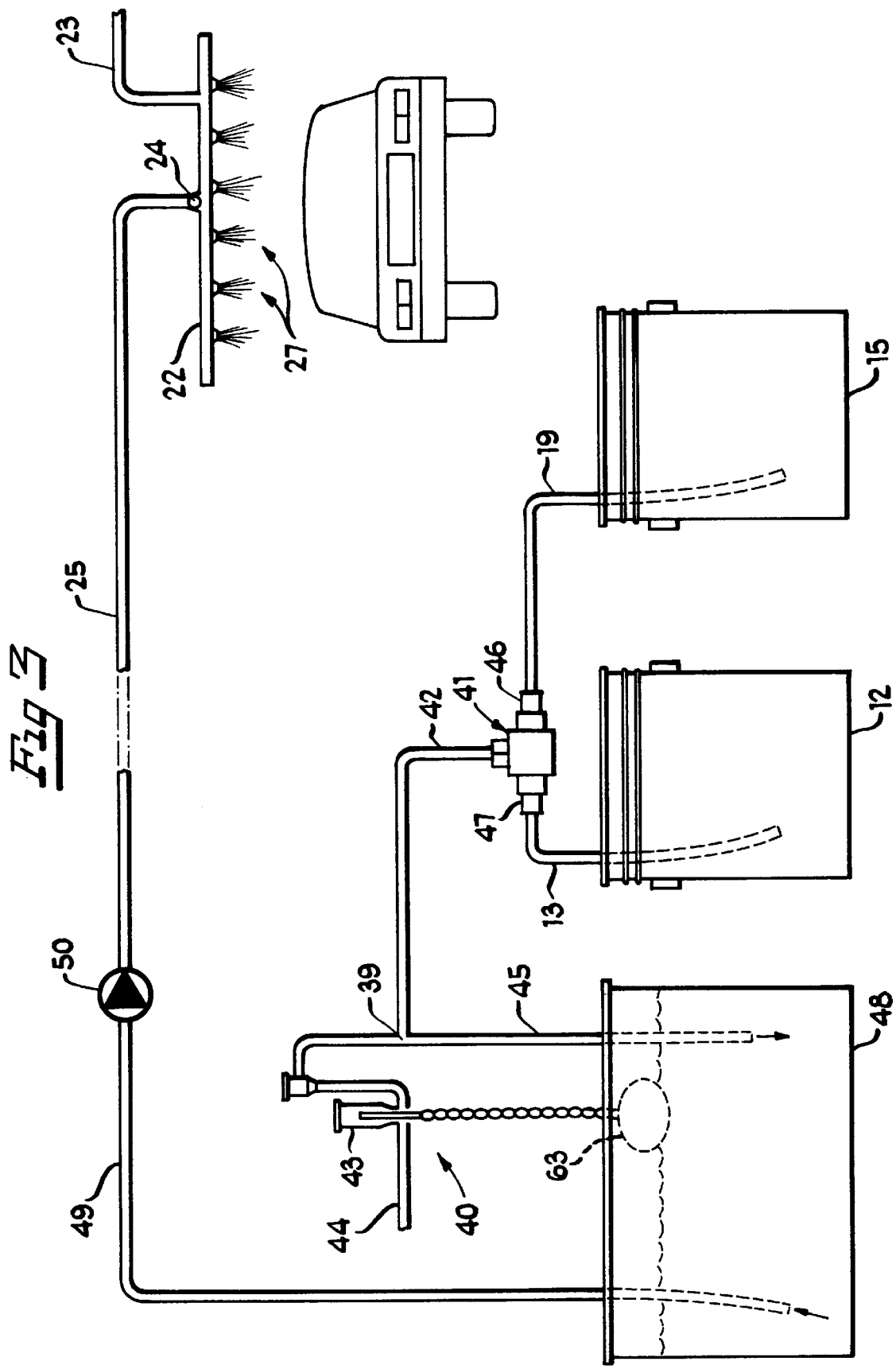

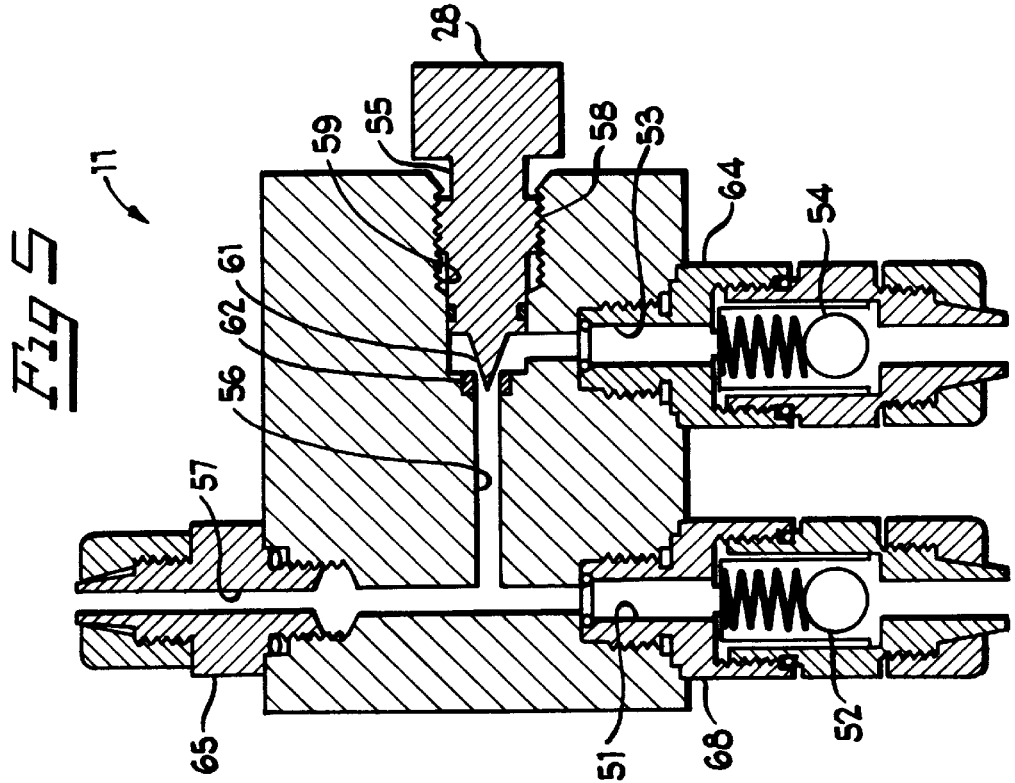
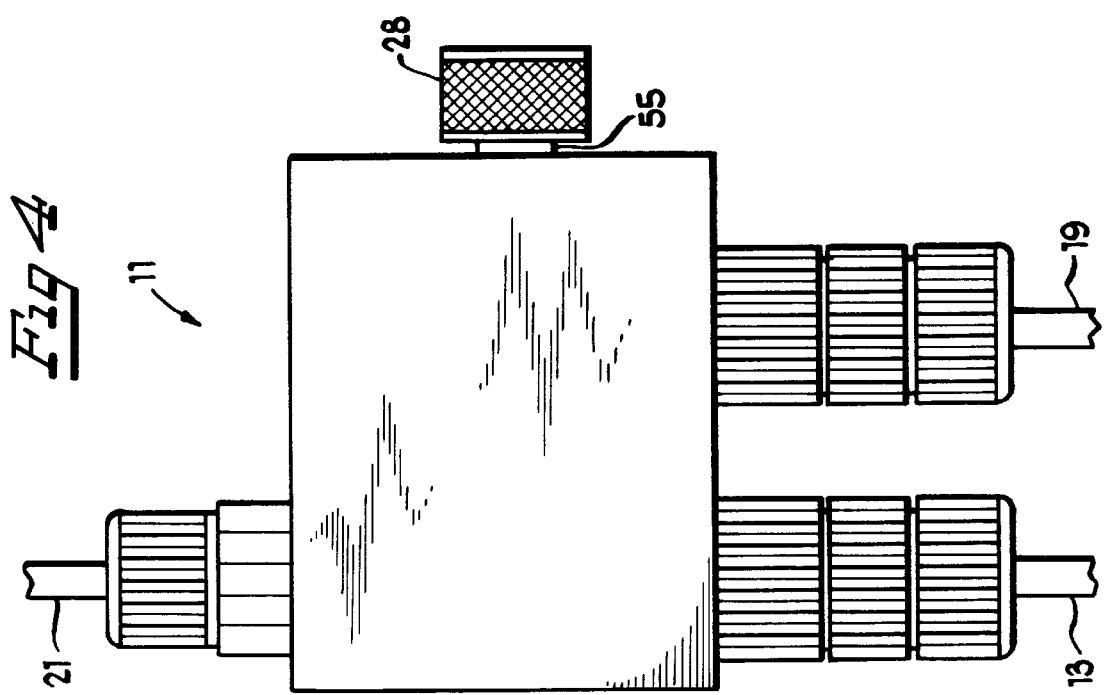

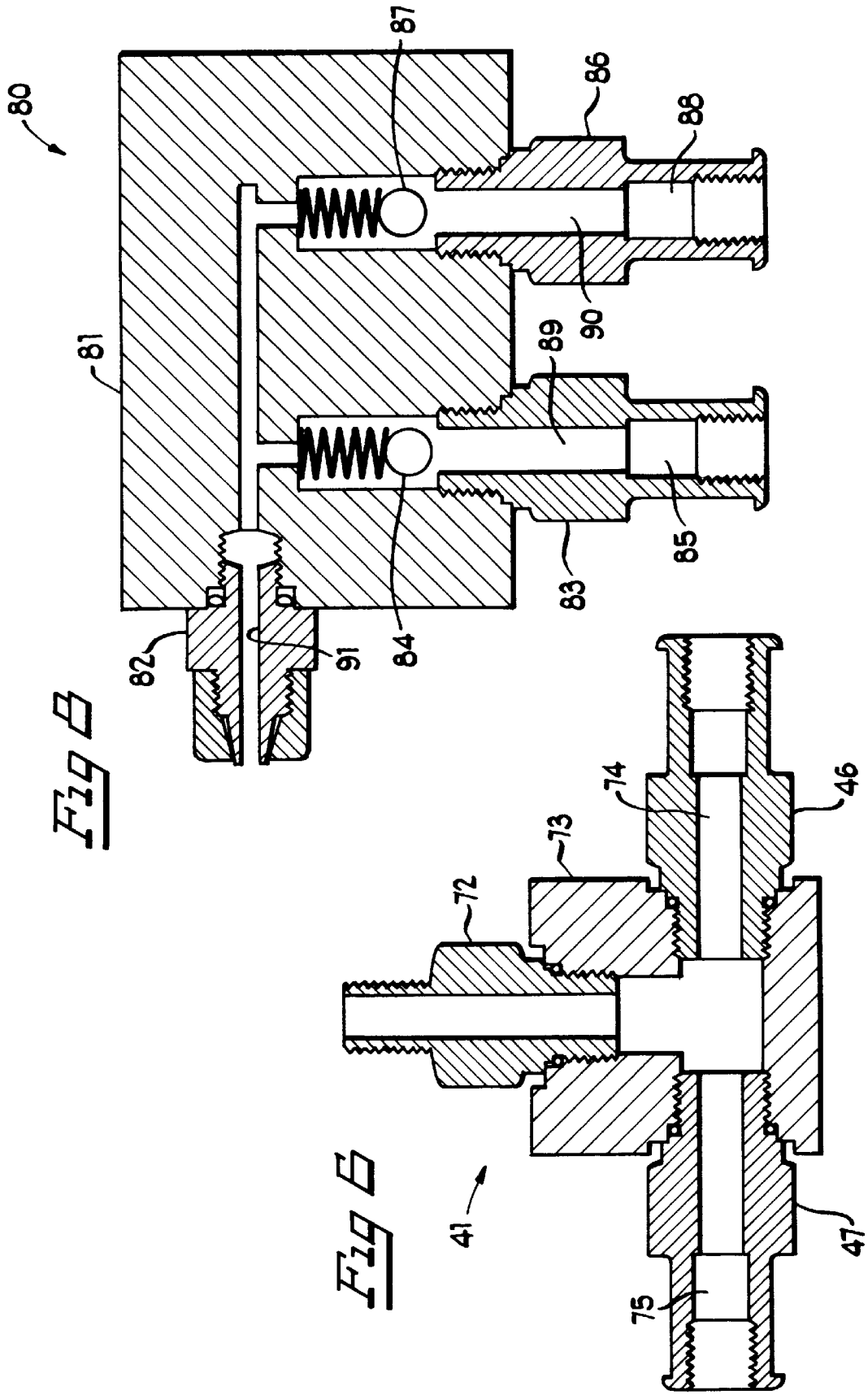

AUTOMATED VEHICLE WASHING SYSTEMS USING CONCENTRATED DETERGENTS

This is a continuation-in-part of application Ser. No. 08/909,241, filed Aug. 11, 1997 now U.S. Pat. No. 5,884,840, which is a continuation-in-part of application Ser. No. 08/296,775, filed Aug. 26, 1994, now U.S. Pat. No. 5,655,713.

BACKGROUND OF THE INVENTION

1. Field of the Invention

This invention relates generally to automated systems for washing and waxing vehicles. More particularly, the invention relates to a modification or a retrofit to existing automated vehicle washing systems that enables operators of existing systems to switch over to new, highly concentrated cleaning and waxing chemicals while still employing the same basic equipment used for conventional, less concentrated chemicals.

2. Description of the Related Art

Chemicals used in automatic car washes are now available in highly concentrated formulas. However, most existing car wash equipment is designed to accommodate conventional, less concentrated chemicals. The present invention addresses the problem of converting automatic car washing equipment from conventional car cleaning and waxing chemicals to highly concentrated car cleaning and waxing chemicals without substantially replacing existing equipment or making expensive and time consuming modifications to the existing car washing equipment.

Existing North American car wash systems generally use conventional chemicals supplied in 55-gallon drums and European car washes generally use conventional chemicals supplied in 25 liter containers. The broad term "chemical" refers to detergents and other cleaning agents as well as to waxes, sealants and other conditioners. The chemicals are typically drawn out of the 55-gallon drum or 25 liter container with a pump, commonly referred to as a "feed pump" or a "direct feed pump", and then injected into an overhead "spray arch" of the car wash where they are mixed with water just before the chemical/water mixture is sprayed onto the vehicles.

In certain conventional car wash systems, the use of highly concentrated chemicals with a conventional spray arch has resulted in the application to vehicles of a chemical/water mixture having a relatively high concentration of chemicals. This can make it quite difficult to properly rinse the chemical/water mixture off of the vehicle after the cleaning step has been completed. Therefore, certain existing vehicle washing systems have required modification before they could employ the more concentrated chemicals.

U.S. Pat. No. 5,655,713 provides a number of solutions to the problem of how to retrofit or convert existing car wash facilities from using conventional detergents (supplied in 55-gallon drums or 25 liter containers) to highly concentrated detergents and waxes that may be in excess of ten times stronger or more concentrated than conventional chemicals. The car wash systems disclosed in U.S. Pat. No. 5,655,713 have provided many ancillary benefits for car wash operations. First, car wash operators are no longer responsible for disposing of the 55-gallon drums or 25 liter containers which normally cannot be deposited in a normal trash bin.

Further, chemical manufacturers have been able to supply concentrated chemicals in a 5-gallon container or 4 liter container, which may include a plastic bag of chemicals enclosed in a protective cardboard box. Sales personnel or account representatives can carry the boxes of chemicals in the trunk of a sedan; a truck or van for delivering the chemicals to car wash operators is not required. The account representatives can move, replace and install the smaller boxes of highly concentrated chemicals without assistance. In contrast, 55-gallon drums can weigh as much as 500 pounds which requires two or more people to move a 55-gallon drum full of chemicals. Workplace injuries as a result of moving of heavy objects such as a full 55-gallon drum can be avoided. Likewise, 25 liter containers may be quite heavy. Further, no special arrangements for the disposal of empty concentrate boxes or bags need to be made. The plastic bags held with the boxes can be recycled, as well as the cardboard box. Thus, the conversion from conventional car wash chemicals to highly concentrated chemicals made possible by the vehicle washing systems described in U.S. Pat. No. 5,655,713 provides benefits to both the chemical manufacturer and car wash operators.

In view of the success of the car wash systems described in U.S. Pat. No. 5,655,713, there has been continued interest in and demand for other car wash systems that allow for the conversion from conventional car wash chemicals to highly concentrated chemicals. However, even though conversions from conventional car wash chemicals to highly concentrated chemicals have been shown to provide benefits to both the chemical manufacturer and car wash operators, car wash operators may still be reluctant to convert to the highly concentrated chemicals if a substantial amount of new equipment or modification to existing equipment is required in order to convert from the regular strength chemicals to the concentrated chemicals. Accordingly, the present invention provides additional means for converting existing car wash operations from conventional chemicals to concentrated chemicals without an excessive amount of new equipment or modification to existing equipment.

It is therefore one object of the present invention to provide an improved system for pre-diluting highly concentrated chemicals for use in automated vehicle washing systems.

It is another object of the present invention to provide an improved retrofit kit for enabling existing automated vehicle washing systems to convert from conventional chemicals to highly concentrated chemicals.

Yet another object of the present invention is to provide an improved method of retrofitting or converting existing automated vehicle washing systems from using conventional chemicals to highly concentrated chemicals.

It has also been discovered that certain car wash operators prefer to apply more than one conventional chemical to a vehicle by way of a conventional spray arch. For instance, a detergent and a detergent booster may be applied together, or a polish wax and a sealer wax may be applied together, or a detergent and a rinse aid may be applied together. Often, the car wash operators will mix the conventional chemicals together in a chemical container, and then apply the chemicals to the vehicles being washed by way of the conventional spray arch. However, this method of applying two chemicals to vehicles has disadvantages. First, as described above, conventional chemicals are typically supplied in large containers which are difficult to transport and discard. Second, certain chemicals do not remain in solution for extended periods of time after mixing, i.e., one of the chemicals may fall out of solution after a short period of time. If separation of the chemicals occurs, a non-uniform mixture of chemicals may be applied to the vehicle by way of the spray arch. Accordingly, there is a need for an improved system for delivering concentrated chemicals for use in automated vehicle washing systems wherein the system also delivers a uniform mixture of two or more concentrated chemicals to a spray arch.

It is therefore another object of the present invention to provide an improved system for delivering highly concentrated chemicals for use in automated vehicle washing systems wherein the system also delivers a uniform mixture of two or more concentrated chemicals.

It is another object of the present invention to provide an improved retrofit kit for enabling existing automated vehicle washing systems to convert from conventional chemicals to highly concentrated chemicals and to deliver a uniform mixture of two or more concentrated chemicals.

Yet another object of the present invention is to provide an improved method of retrofitting or converting existing automated vehicle washing systems from using conventional chemicals to highly concentrated chemicals wherein the vehicle washing system delivers a uniform mixture of two or more concentrated chemicals to a spray arch.

SUMMARY OF THE INVENTION

The present invention satisfies one of the foregoing needs of car wash operators by providing an inexpensive mechanism for the pre-dilution of highly concentrated car wash chemicals so the concentrated chemicals can be used with the equipment in place at existing car wash facilities without an excessive amount of modification to the equipment. Specifically, the present invention provides a means for pre-diluting the concentrated chemicals with water before they are mixed with the main water supply in the overhead spray arch of the car wash which sprays the fully diluted concentrates onto the vehicle.

The present invention satisfies another of the foregoing needs of car wash operators by providing an inexpensive mechanism for controlling the volume of a combination of highly concentrated car wash chemicals that are delivered to the spray arch of existing car wash facilities. As a result, the concentrated chemicals can be used with the equipment in place at an existing vehicle washing facility without an excessive amount of modification to the equipment, and a uniform mixture of two or more concentrated chemicals can be diluted with water and applied to a vehicle. Specifically, the present invention provides a means for controlling the volume of a combination of concentrated chemicals that is delivered to the overhead spray arch of a car wash before the concentrated chemicals are mixed with water in the spray arch and the diluted concentrates are sprayed onto a vehicle.

The modifications to the existing car wash equipment in each embodiment of the invention are minimal and the new equipment is add-on equipment which relates to the concentrated chemical delivery steps only. The modifications required by the present invention do not effect the pump systems which pump the concentrate to the spray arch or any of the valves or fittings relating to the spray arch. Therefore, there is no need to replace the pump systems and the spray arch in the existing car wash.

One embodiment of the present invention includes two reservoirs: a first concentrate reservoir and a second concentrate reservoir. The reservoirs may be in the form of a 5-gallon plastic bag contained within a cardboard box, or a 15-gallon secondary container filled with concentrated chemicals that are provided in a 5-gallon plastic bag contained within a cardboard box.

Both the first concentrate reservoir and the second concentrate reservoir are connected to separate input passages of a pre-dilution block. Inside the pre-dilution block, the passageway for the first concentrate and the passageway for the second concentrate are connected to form a common output passageway. Thus, the pre-dilution block provides a mixing chamber for the first concentrate and the second concentrate in the form of a common output passageway. In the preferred embodiment, the pre-dilution block also includes a means for controlling the input flow of either the first concentrate or the second concentrate. The means for controlling the input flow is preferably a stem valve that controls the input rate of the second concentrate, thereby leaving the input flow rate of the first concentrate constant. It will also be noted that, by controlling flow through one channel (i.e., the second concentrate), one also controls the flow through the other channel (i.e., the first concentrate).

The mixture of the first and the second concentrate leaves the pre-dilution block through the common output passageway and enters a feed pump where it is pumped to the spray arch (or dispensing arch) through an injection valve or check valve. At the injection valve and inside the arch, the mixture of the first concentrate and the second concentrate is further mixed with the main water supply before the mixture of concentrates and water from the main water supply is sprayed onto the vehicle.

The first embodiment of the invention provides a means for controlling the volume of concentrated chemicals that are delivered to the spray arch of an existing vehicle washing facility. In addition, the system solves the problems associated with the separation of two or more chemicals in the chemical supply container of a conventional vehicle washing facility.

A second embodiment of the present invention does not employ a pre-dilution block as described above but utilizes an existing proportioning and dispensing system already in place at the car wash facility in combination with a pre-dilution double-tip metering assembly. If the facility is equipped with an automatic liquid level control proportioner, like those sold under the HYDROMINDER™ trademark, the first concentrate reservoir and the second concentrate reservoir must be provided and are connected to a pre-dilution double-tip assembly which is connected to the HYDROMINDER™ body. The double-tip assembly includes two input passages—one for the first concentrate and one for the second concentrate. The output of the double-tip assembly is connected to the HYDROMINDER™ body. Water from the main water supply flows through the HYDROMINDER™ body. The venturi effect of the water flowing through the HYDROMINDER™ body draws a mixture of the first concentrate and the second concentrate out of the double-tip assembly and into the output stream of the HYDROMINDER™ system. The actual flow rates of the first concentrate and the second concentrate through the double-tip assembly are controlled by metering tips that disposed within the input passages for the first concentrate and the second concentrate respectively. The size of each metering tip will depend upon the specific chemical being used and peculiarities of the car wash system.

The output stream from the HYDROMINDER™ system is deposited into a stock solution tank. When the stock solution tank reaches a desired level, a float-valve mechanism, connected to the HYDROMINDER™ system, shuts off input to the HYDROMINDER™ system which, in turn, stops drawing the first concentrate and the second concentrate from their respective reservoirs. Stock solution is pumped from the stock solution tank to the spray arch where it is diluted with water from the main water supply.

Thus, this modified HYDROMINDER™ system dilutes the chemicals three times: (1) in the double-tip assembly where the first and the second concentrates are mixed; (2) in the HYDROMINDER™ body with water flowing through the HYDROMINDER™ system; and (3) again, in the spray arch with water from the main water supply.

The second embodiment of the invention also provides a means for controlling the volume of concentrated chemicals that are delivered to the spray arch of an existing vehicle washing facility. In addition, the system solves the problems associated with the separation of two or more chemicals in the chemical supply container of a conventional vehicle washing facility.

A third embodiment of the present invention also utilizes an existing proportioning and dispensing system already in place at the car wash facility in combination with a double-tip metering assembly. If the facility is equipped with an automatic liquid level control proportioner, like those sold under the HYDROMINDER™ trademark, a concentrate reservoir must be provided and connected to the double-tip assembly which is connected to the HYDROMINDER™ body. The double-tip assembly includes two input passages—one for the concentrate and one for a washing solution which is contained in a stock solution tank. The output of the double-tip assembly is connected to the HYDROMINDER™ body. Water from the main water supply flows through the HYDROMINDER™ body. The venturi effect of the water flowing through the HYDROMINDER™ body draws a mixture of the concentrate and the washing solution through the double-tip assembly and into the output stream of the HYDROMINDER™ system. The actual flow rates of the concentrate and the washing solution through the double-tip assembly are controlled by metering tips that disposed within the input passages for the concentrate and the washing solution respectively. The size of each metering tip will depend upon the specific chemical being used and peculiarities of the car wash system.

The output stream from the HYDROMINDER™ system is deposited into the stock solution tank. When the stock solution tank reaches a desired level, a float-valve mechanism, connected to the HYDROMINDER™ system, shuts off input to the HYDROMINDER™ system which, in turn, stops drawing the concentrate and the washing solution from their respective reservoirs. Washing solution is pumped from the stock solution tank to the spray arch where it is diluted with water from the main water supply.

It can be appreciated that the washing solution in the stock solution tank in the third embodiment of the invention serves two purposes: (1) a portion of the washing solution is drawn through the double-tip metering assembly in order to partially dilute the concentrate before the washing solution—concentrate mixture is further mixed with water, and (2) a portion of the washing solution is pumped to the spray arch where it is diluted with water before being spray on a vehicle.

Thus, the second modified HYDROMINDER™ system dilutes the chemicals three times: (1) in the double-tip assembly where the concentrate and the washing solution are mixed; (2) in the HYDROMINDER™ body with water flowing through the HYDROMINDER™ system; and (3) again, in the spray arch with water from the main water supply.

The present invention also lends itself to improved methods for retrofitting existing car washes. Specifically, with reference to the first embodiment, an account representative can easily supply the car wash operator with a pair of concentrate reservoirs, each in the form of a secondary container which is preferably large enough (15 gallons) to hold from two to three 5-gallon bag-in-a-box containers of concentrate. The concentrate reservoirs are connected to the respective input passages of a pre-dilution block, which again, is supplied by the account representative. The output of the pre-dilution block is then connected to a feed pump which would already be in place because it would be previously used to draw chemicals out of the 55-gallon drum. The feed pump is already connected to an injection valve that is mounted at the spray arch. The spray arch is connected to the main water supply which mixes with the concentrate solution to create still a diluted output for application to the vehicles.

Thus, the only equipment that the car wash operator or the account representative must supply is the pre-dilution block and the concentrate reservoirs which can simply be a 15 gallon bucket. Of course, the concentrates would also be supplied by the account representative in the form of a 5 gallon package or 5 gallon bag-in-a-box which is substantially easier for the account representative to supply than conventional chemicals which are normally provided in a 55-gallon drum. In certain car wash installations, it may also be possible to connect the 5 gallon concentrate packages directly to the respective input passages of the pre-dilution block, thereby eliminating the need for 15 gallon secondary containers.

Referring to the second embodiment, again, the account representative provides the concentrate reservoirs and the double-tip metering assembly. The account representative then connects the concentrate reservoirs to the double-tip metering assembly and connects the output of the double-tip metering assembly to the HYDROMINDER™ dispensing system which is already in place. The output of the HYDROMINDER™ dispensing system flows into the stock solution tank which is already in place. As discussed above, the HYDROMINDER™ dispensing system combines the pre-mix of concentrates with water from the main water supply. The output of the HYDROMINDER™ dispensing system flows into the stock solution tank which is already connected to a pump which pumps the fluid to the spray arch where it is again mixed with water from the main water supply before it is applied to vehicles.

Therefore, in the second embodiment of the invention, the only equipment provided by the account representative is a double-tip metering assembly and the concentrate reservoirs. Of course, the concentrates would also be supplied by the account representative in the form of a 5 gallon package or 5 gallon bag-in-a-box. In certain car wash installations, it may also be possible to connect the 5 gallon concentrate packages directly to the respective input passages of the double-tip metering assembly, thereby eliminating the need for 15 gallon secondary containers.

Referring to the third embodiment, the account representative provides a concentrate reservoir and a double-tip metering assembly. The account representative then connects the concentrate reservoir and the stock solution tank to the double-tip metering assembly and connects the output of the double-tip metering assembly to the HYDROMINDER™ dispensing system which is already in place. The output of the HYDROMINDER™ dispensing system flows into the stock solution tank which is already in place. As discussed above, the HYDROMINDER™ dispensing system combines the mix of concentrate and washing solution with water from the main water supply. The output of the HYDROMINDER™ dispensing system flows into the stock solution tank which is already connected to a pump which pumps the washing solution to the spray arch where it is again mixed with water from the main water supply before it is applied to vehicles.

Therefore, in the third embodiment of the invention, the only equipment provided by the account representative is a double-tip metering assembly and a concentrate reservoir. Of course, the concentrate would also be supplied by the account representative in the form of a 5 gallon package or 5 gallon bag-in-a-box. In certain car wash installations, it may also be possible to connect the 5 gallon concentrate package directly to the concentrate input passage of the double-tip metering assembly, thereby eliminating the need for a 15 gallon secondary container.

Thus, improved systems for retrofitting existing automated vehicle washing systems are provided that enable an existing system to convert from conventional chemicals to highly concentrated chemicals. In addition, certain versions of the improved systems solve the problem of separation of car wash chemicals in a chemical supply container and therefore, enable a car wash operator to apply a uniform mixture of two or more concentrated chemicals to vehicles.

BRIEF DESCRIPTION OF THE DRAWINGS

These and other features, aspects, objects, and advantages of the present invention will be become better understood upon consideration of the following detailed description, appended claims and accompanying drawings where:

FIG. 2 is a schematic view of an automated vehicle washing system in accordance with the present invention, particularly illustrating a means for controlling the volume of highly concentrated chemicals delivered to the spray arch of a vehicle washing system;

FIG. 3 is a schematic view of an alternate automated vehicle washing system in accordance with the present invention, particularly illustrating a means for controlling the volume of highly concentrated chemicals delivered to the spray arch of a vehicle washing system;

FIG. 4 is a side view of the pre-dilution block first shown in FIG. 2 as made in accordance with the present invention;

FIG. 5 is a sectional view of the pre-dilution block shown in FIG. 4;

FIG. 6 is a sectional view of a double-tip metering assembly first shown in FIG. 3 as made in accordance with the present invention;

FIG. 8 is a sectional view of an alternate double-tip metering assembly first shown in FIG. 7 as made in accordance with the present invention.

Figure 1:
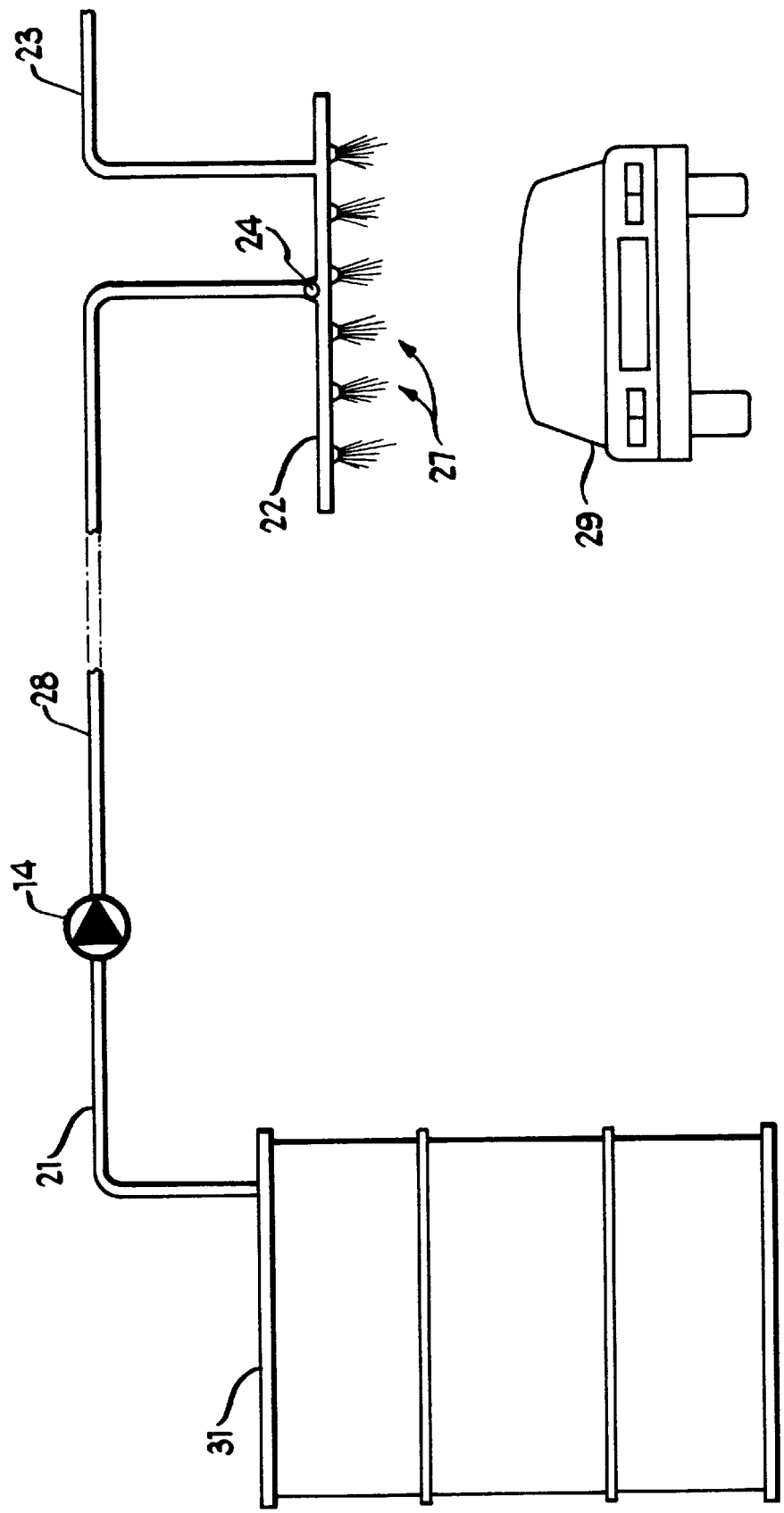
FIG. 1 is a schematic illustration of an automated vehicle washing system found in the prior art, particularly illustrating the use of conventional chemicals provided in a large drum.

It should be understood that the invention is illustrated more or less diagrammatically in the drawings and that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DETAILED DESCRIPTION OF THE INVENTION

Referring now to FIG. 1, there is shown a version of an automated vehicle washing system known in the art. This vehicle washing system, which would be common in a North American car wash, includes a feed pump 14 which draws a conventional chemical out of a 55-gallon drum 31 through a conduit 21. Alternatively, an existing European car washing system would generally include a 25 liter container instead of a 55-gallon drum. The feed pump 14 then pumps the conventional chemical through a conduit 25 to an injection valve 24. The injection valve 24 injects the conventional chemical into a spray arch 22 where it is mixed with water which is pumped from a main water supply through a conduit 23. The mixture of chemical and water is then forced through spray nozzles 27 and onto a vehicle 29.

FIG. 2 is an illustration of a system for washing vehicles 10 that employs a pre-dilution block 11. A first highly concentrated chemical, or concentrate, is provided in a first concentrate reservoir 12, or in a self-contained bag-in-a-box container. The first concentrate is drawn upward through a conduit 13 under the pressure drop created by the feed pump 14.

The first concentrate is mixed in the pre-dilution block 11 with a second concentrate from a second concentrate reservoir 15. The second concentrate proceeds up through a conduit 19 and into the pre-dilution block 11 where it is mixed with the first concentrate before it passes out of the block 11 through the conduit 21. The second concentrate also proceeds up through the conduit 19 due to the pressure drop created by the feed pump 14.

The mixture of the first concentrate and the second concentrate in the conduit 21 is pumped forward by the feed pump 14 to the spray arch 22 where it is combined with water from the main water supply that is connected to the conduit 23. Water from the main water supply may be pumped into the spray arch 22 if the water pressure supplied by the municipality is not sufficiently high. Thus, a mixture of the first concentrate and the second concentrate in the conduit 25 is pumped through the injection or check valve 24 and into the spray arch 22 where it is mixed with water from the main water supply which is being pumped from the conduit 23 into the spray arch 22. The mixture of the first concentrate, the second concentrate, and water from the main water supply is forced through the nozzles 27 and onto the vehicle 29.

Comparing FIGS. 1 and 2, one can seen how easy it is to install the system shown in FIG. 2. First, the feed pump 14 is normally already in place because such a pump is required to draw conventional chemical out of a 55-gallon drum 31. The pump 14 pumps the chemical through the conduit 25 to the injection valve 24. The injection valve 24 injects the chemical into the spray arch 22 where it is mixed with water supplied through the conduit 23.

Referring to FIGS. 1 and 2 together, it is evident that the only modifications that need to be made to implement the system 10 shown in FIG. 2 are disposed upstream of the feed pump 14. Thus, the 55-gallon drum 31 shown in FIG. 1 is replaced by the pre-dilution block 11, the first concentrate reservoir 12 and the second concentrate reservoir 15 shown in FIG. 2. The retrofit is fast, easy and inexpensive, all of which will be greatly appreciated by car wash operators.

Depending on the concentration or strength of the concentrates provided in the first concentrate reservoir 12 and the second concentrate reservoir 15, the dilution ratios provided by the system 10 shown in FIG. 2 can vary. Of course, the ultimate dilution ratio (parts of water per part of concentrate) will be determined by a number of variables including the rate at which fresh water from the main water supply is provided to the spray arch 22, the rate at which the first pump 14 is operating, and the rate at which the concentrates are provided to the pre-dilution block as well as others. The rate at which the concentrates are supplied to the pre-dilution block 11 may be controlled by adjusting the knurled knob 28 which controls a stem valve disposed within the dilution block 11. Essentially, rotation of the knob 28 can fully open the flow of the second concentrate upward through the conduit 19 or completely shut off the flow of the second concentrate through the conduit 19. Controlling the flow rate of the second concentrate also affects the flow rate of the first concentrate through the block 11. Simply put, a person skilled in the art will understand the desired dilution ratio (parts of water per parts of each concentrate) required and will be able to make the appropriate adjustments to the system to achieve the desired dilution ratio.

Turning now to FIG. 3, an alternative system for washing vehicles 40 is illustrated. The same first concentrate reservoir 12 and second concentrate reservoir 15 are provided in this system. However, the pre-dilution block 11 (shown in FIG. 2) has been replaced by a double-tip metering assembly 41 where the first concentrate from the conduit 13 is mixed with the second concentrate from the conduit 19 to produce a mixture which is passed through an output conduit 42. The output conduit 42 is connected to a proportioning and dispensing system shown generally at 43. This type of system 43 is often sold under the HYDROMINDER™ trademark. The mixture of the first concentrate and the second concentrate from the conduit 42 is mixed with pre-dilution water from the main water supply which is provided through a conduit 44. The flow of water from the conduit 44 through the system 43 creates a venturi effect at the connection 39 which draws the second concentrate through the conduit 19 and through the metering tip 46. The same venturi effect at the connection 39 draws the first concentrate through the conduit 13 and through the metering tip 47. Thus, the output conduit 45 carries a mixture of the first concentrate, the second concentrate and pre-dilution water from the main water supply and the mixture is deposited into a holding tank or stock solution tank 48. When the stock solution tank 48 is full, a float 63 raises upward and closes the valve 43 to shut off the flow of pre-dilution water through the conduit 44. Of course, the venturi effect at the connection 39 is also stopped thereby shutting off the flow of the first and the second concentrate as well. The mixture of the first concentrate, the second concentrate, and pre-dilution water is then pumped forward from the stock solution tank 48 through the conduit 49 by a feed pump 50 to the spray arch 22. The conduit line 25 is connected to an injection or check valve shown at 24. The mixture of concentrates, and pre-dilution water is diluted in the spray arch with water supplied through the conduit 23. The dilution ratio (parts of water per part of each concentrate) will be principally controlled by the size of the metering tips 46, 47 which control the flow of the first concentrate through the conduit 13 and the flow of the second concentrate through the conduit 19 respectively. Specifically, by varying the size of the tips 46, 47, one can control the dilution ratio.

Thus, the vehicle washing system 40 shown in FIG. 3 provides three locations for the mixing of concentrates and the mixing and dilution of concentrates and water: (1) at the double-tip assembly 41 where two concentrates are mixed; (2) at the connection 39 where the mixture of concentrates is diluted with water flowing through the valve 43; and (3) in the spray arch 22 where the solution from the tank 48 is again diluted with water from the conduit 23.

Turning to FIGS. 4 and 5, the pre-dilution block shown at 11 in FIG. 2 is illustrated in greater detail. The first concentrate enters the block 11 through a first concentrate input passage 51. Before the first concentrate enters through the passage 51, it passes through a check valve 52 which prevents any reverse flow of concentrate mixture downward through the passage 51 toward the first concentrate reservoir 12 (see FIG. 2). The second concentrate enters the block 11 through a second concentrate input passage 53. Another check valve 54 is provided to prevent reverse flow of concentrate mixture downward toward the second concentrate reservoir 15. In the pre-dilution block 11 illustrated in FIG. 5, a stem valve 55 is provided to control the flow of the second concentrate through the second concentrate input passage 53, an intermediate passage 56, and therefore out through the common output passage 57. The stem valve 55 includes threads 58 which engage a threaded opening 59 of the block 11. To close the stem valve 55 and prevent the flow of the second concentrate through the second concentrate input passage 53, the operator twists a knurled knob 28 so as to move the stem valve 55 to the left as shown in FIG. 5 so that a lower end 61 of the stem valve 55 will engage a seal 62 in the second concentrate input passage 53. It can be appreciated that the stem valve 55 is fully adjustable between a fully closed position where the flow of the second concentrate through the second concentrate input passage 53 is prevented, and a fully open position where a maximum amount of the second concentrate flows through the second concentrate input passage 53.

FIG. 6 is a detailed illustration of the double-tip assembly 41 used in the vehicle washing system shown in FIG. 3. A fitting 72 is connected to the conduit 42 that leads into the valve 43 at the connection 39 as shown in FIG. 3. The fitting 72 is threadably connected to a block 73. Metering tips 46,47 are also threadably connected to the block 73. The metering tip 46 includes an insert 74 having a pre-determined diameter, and the other metering tip 47 includes an insert 75 having a pre-determined diameter. If it is determined that less concentrate should flow through either conduit 13,19 to the conduit 42, then the inserts 74,75 can be changed to an insert of smaller diameter. In contrast, if more concentrate is desired, the inserts 74,75 can be changed to an insert with a larger diameter. In the preferred method of operating the vehicle washing system, the inserts 74,75 are color-coded which will make it easier for the operator of the system to identify the appropriate insert to be used.

Figure 7:
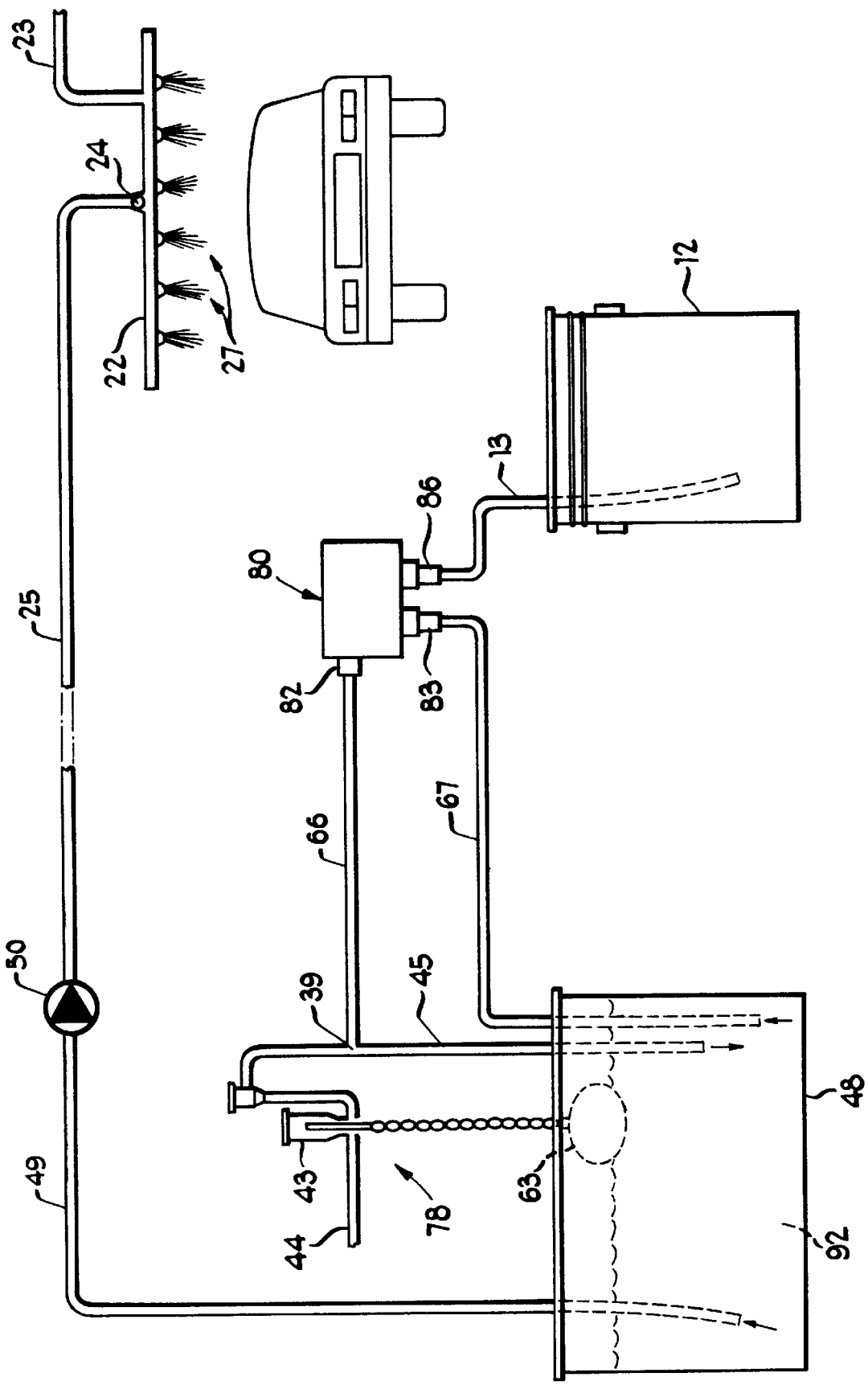
FIG. 7 is a schematic view of another alternate automated vehicle washing system in accordance with the present invention, particularly illustrating a means for diluting highly concentrated chemicals prior to application of the diluted chemicals to the vehicles.

Turning now to FIG. 7, another alternative system for washing vehicles 78 is illustrated. The same concentrate reservoir 12 is provided in this system. However, the double-tip metering assembly 41 (shown in FIG. 3) has been replaced by an alternate double-tip metering assembly 80 where the concentrate from the conduit 13 is mixed with washing solution 92 from a conduit 67 to produce a mixture which is passed through an output conduit 66. The output conduit 66 is connected to a proportioning and dispensing system shown generally at 43. This type of system 43 is often sold under the HYDROMINDER™ trademark. The mixture of the first concentrate and the washing solution from the conduit 66 is mixed with water from the main water supply which is provided through a conduit 44. The flow of water from the conduit 44 through the system 43 creates a venturi effect at the connection 39 which draws the washing solution through the conduit 67 and through the metering tip 83. The same venturi effect at the connection 39 draws the concentrate through the conduit 13 and through the metering tip 86. Thus, the output conduit 45 carries a mixture of the concentrate, the washing solution, and water from the main water supply, and the mixture is deposited into a washing solution or stock solution tank 48. When the washing solution or stock solution tank 48 is full, a float 63 raises upward and closes the valve 43 to shut off the flow of water through the conduit 44. Of course, the venturi effect at the connection 39 is also stopped thereby shutting off the flow of the concentrate as well. A portion of the washing solution in the washing solution tank 48 is then pumped forward from the washing solution tank 48 through the conduit 49 by a feed pump 50 to the spray arch 22. The conduit line 25 is connected to an injection or check valve shown at 24. The mixture of concentrate and water is diluted in the spray arch with water supplied through the conduit 23. The dilution ratio (parts of water per part of concentrate) will be principally controlled by the size of the metering tips 83,86 which control the flow of the first concentrate through the conduit 13 and the flow of the washing solution through the conduit 67 respectively. Specifically, by varying the size of the tips 83,86, one can control the dilution ratio.

Thus, the vehicle washing system 78 shown in FIG. 7 provides three locations for the mixing and dilution of concentrate and water: (1) at the double-tip assembly 80 where the concentrate and washing solution are mixed; (2) at the connection 39 where the mixture of concentrate and washing solution is diluted with water flowing through the valve 43; and (3) in the spray arch 22 where the solution from the tank 48 is again diluted with water from the conduit 23.

It can be appreciated that the washing solution 92 in the washing solution tank 48 in the third embodiment of the invention serves two purposes: (1) a portion of the washing solution is drawn through the double-tip metering assembly 80 in order to partially dilute or pre-dilute the concentrate before the washing solution—concentrate mixture is further diluted and mixed with water at the connection 39; and (2) a portion of the washing solution is pumped to the spray arch where it is diluted with water before being sprayed on a vehicle. It can be appreciated that by using the same washing solution to dilute concentrate and to supply the spray arch with washing solution, the modifications necessary to convert an existing car wash installation to the use of concentrated chemicals are minimized.

Installation of the car wash system 78 as shown in FIG. 7 is uncomplicated as can be seen from the following description of the method of retrofitting an existing car wash. First, the feed pump 50, the washing or stock solution tank 48, and the proportioning and dispensing system shown generally at 43 are normally already in place at a car wash installation. Therefore, referring to FIG. 7, it is evident that the only modifications that need to be made to implement the system 78 are disposed upstream of the proportioning and dispensing system 43. Specifically, a concentrate reservoir 12 containing concentrate and the double-tip assembly 80 must be provided. Then, a conduit is connected between the concentrate reservoir 12 and a concentrate input passage of the double-tip assembly 80, and a second conduit is connected between the pre-existing washing solution tank 48 and a washing solution input passage of the double-tip assembly 80. Finally, a third conduit is connected between a common output passage of the double-tip assembly 80 and the proportioning and dispensing system 43. The retrofit is fast, easy and inexpensive, all of which will be greatly appreciated by car wash operators.

FIG. 8 is a detailed illustration of the alternate double-tip assembly 80 used in the vehicle washing system 78 shown in FIG. 7. Concentrate enters the double-tip assembly 80 through a concentrate input passage 90. Before the concentrate enters an output passage 91, it passes through a check valve 87 which prevents any reverse flow of concentrate, washing solution or water downward through the concentrate input passage 90 toward the concentrate reservoir 12 (see FIG. 7). Washing solution enters the double-tip assembly through a washing solution input passage 89. Another check valve 84 is provided to prevent any reverse flow of concentrate, washing solution or water downward toward the washing solution tank 48.

The double-tip assembly 80 includes a fitting 82 that is connected to the conduit 66 that leads into the connection 39 as shown in FIG. 7. The fitting 82 is threadably connected to a block 81. The metering tips 83,86 are also threadably connected to the block 81. The metering tip 83 includes an insert 85 having a pre-determined diameter, and the other metering tip 86 also includes an insert 88 having a pre-determined diameter. If it is determined that less concentrate or washing solution should flow through either conduit 13,67 to the conduit 66, then the inserts 85,88 can be changed to an insert of smaller diameter. In contrast, if more concentrate or washing solution is desired, the inserts 85,88 can be changed to an insert with a larger diameter. In the preferred method of operating the vehicle washing system, the inserts 85,88 are color-coded which will make it easier for the operator of the system to identify the appropriate insert to be used.

It can be appreciated that the alternate double-tip assembly 80 shown in FIG. 8 could also be used in place of the double-tip assembly 41 used in the vehicle washing system 40 shown in FIG. 3. By providing check valves in the input passages of the double-tip assembly, any reverse flow of concentrates or water downward through the input passages toward the concentrate reservoirs 12 (see FIG. 3) can be avoided.

Thus, three improved methods of retrofitting existing car wash systems to accommodate hyper or highly concentrated detergents are provided. All of the equipment needed to complete the retrofit is inexpensive. The systems shown in FIGS. 2, 3 and 7 will make it easy for the manufacturers of highly concentrated chemicals to convince car wash operators to switch from the conventional chemicals provided in a 55-gallon drum to the highly concentrated chemicals provided in a 5 gallon bag-in-a-box container. In addition, the systems of FIGS. 2 and 3 will allow car wash operators to apply multiple chemicals to a vehicle by way of a conventional spray arch without having to worry about the separation of the chemicals in the chemical supply container.

Although only three embodiments of the present invention have been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

What is claimed is:

1. A system for diluting concentrates with water prior to application of the concentrates to vehicles comprising:
   a first concentrate reservoir containing a first concentrate;
   a second concentrate reservoir containing a second concentrate;
   a pre-dilution block for mixing the first concentrate with the second concentrate;
   the first concentrate reservoir being in fluid communication with the pre-dilution block, and the second concentrate reservoir being in fluid communication with the pre-dilution block;
   the pre-dilution block including a first concentrate input passage and a second concentrate input passage, the first concentrate input passage and the second concentrate input passage being connected to a common output passage through which a mixture of the first concentrate and the second concentrate passes;
   the pre-dilution block including a flow regulating device, said flow regulating device being adjustable to control the amount of the second concentrate through the second concentrate input passage;
   the output passage of the pre-dilution block being in fluid communication with a feed pump;
   the first concentrate and the second concentrate being drawn by the feed pump through the first concentrate input passage and the second concentrate input passage respectively before the first concentrate and the second concentrate are mixed in the common output passage of the pre-dilution block before the mixture of the first concentrate and the second concentrate is pumped through the feed pump to a first input passage of a spray arch;
   the spray arch including a second input passage in fluid communication with a main water supply, the mixture of the first concentrate and the second concentrate in the first input passage being mixed with water from the main water supply in the spray arch before passing out of the spray arch through a plurality of spray nozzles.

2. The system of claim 1 wherein the said flow regulating device includes:
   a stem valve including a threaded stem that is threadably connected to the pre-dilution block, a lower end of the threaded stem extending into the second concentrate input passage, and
   a seal disposed in the second concentrate input passage, the seal capable of engaging the lower end of the threaded stem to shut off the flow of the second concentrate through the second concentrate input passage.

3. The system of claim 2 wherein:
   the second concentrate input passage includes a check valve to prevent flow of concentrate or mixture from the pre-dilution block toward the second concentrate reservoir.

4. The system of claim 2 wherein:
   the first concentrate input passage includes a check valve to prevent flow of concentrate or mixture from the pre-dilution block toward the first concentrate reservoir.

5. A system for mixing water and liquid concentrate to form a washing solution and for delivering said washing solution to a vehicle comprising:
   a first reservoir containing a first washing chemical other than substantially pure water;
   a second source providing a supply of second washing chemical other than substantially pure water;
   a mixing assembly including a first washing chemical input passage in communication with the first reservoir and a second input passage in communication with the second source, the mixing assembly including a mixing block having a common output passage through which a mixture of the first washing chemical and the second washing chemical passes forming a pre-mix;
   said system including a pump and vehicle application device, said pump moving the pre-mix in the direction of said spray arch, said vehicle application device delivering a mixture of said pre-mix and water to a vehicle.

6. The system of claim 5 wherein:
   said mixing assembly includes a pre-mix reservoir downstream of said mixing block in which said pre-mix is stored after exiting said mixing block, and
   said pump takes pre-mix from said pre-mix reservoir and pushes said pre-mix in the direction of said application device, and
   said vehicle application device is a spray arch with inwardly directed nozzles, and
   the first concentrate input passage of said mixing assembly includes a metering tip to limit flow of the first concentrate through the first concentrate input passage towards the common output passage of the double tip assembly.

7. The system of claim 5 wherein:
   said mixing pump is connected to receive said pre-mix directly from said common output passage of said mixing block, and
   the second concentrate input passage of the mixing assembly includes a metering tip to limit flow of the second concentrate through the second concentrate input passage towards the common output passage of the double tip assembly.

8. The system of claim 5 wherein:
   the first concentrate input passage of the mixing assembly includes a check valve to prevent flow of concentrate or water from the double tip assembly toward the first concentrate reservoir.

9. The system of claim 5 wherein:
   the second concentrate input passage of the mixing assembly includes a check valve to prevent flow of concentrate or water from the double tip assembly toward the second concentrate reservoir.

10. A system for washing vehicles comprising:
    a concentrate reservoir containing concentrate;
    a double tip assembly for mixing a washing solution from a washing solution tank with the concentrate;
    the double tip assembly including a concentrate input passage in communication with the concentrate reservoir and a washing solution input passage in communication with the washing solution tank, the concentrate input passage and the washing solution input passage being connected to an output passage through which a mixture of concentrate and washing solution passes;
    the output passage of the double tip assembly being in fluid communication with a three-way valve;
    the three-way valve including a main water supply input passage and a pre-mix input passage which is connected to the common output passage of the double tip assembly, the main water supply input passage and the pre-mix input passage of the three-way valve being connected to a washing solution output passage through which a mixture of water from the main water supply and a pre-mixture of concentrate and washing solution passes;
    the washing solution output passage of the three-way valve being in communication with the washing solution tank, the washing solution tank being connected to a pump;

a portion of the washing solution being pumped from the washing solution tank to a spray arch, the spray arch also being connected to the main water supply;

the washing solution being mixed with additional water from the main water supply in the spray arch before passing out of the spray arch through spray nozzles disposed in the spray arch.

11. The system of claim 10 wherein:

the washing solution input passage of the double tip assembly includes a metering tip to limit flow of washing solution through the washing solution input passage towards the common output passage of the double tip assembly.

12. The system of claim 10 wherein:

the concentrate input passage of the double tip assembly includes a metering tip to limit flow of concentrate through the concentrate input passage towards the common output passage of the double tip assembly.

13. The system of claim 10 wherein:

the washing solution input passage of the double tip assembly includes a check valve to prevent flow of concentrate or water or washing solution from the double tip assembly toward the washing solution tank.

14. The system of claim 10 wherein:

the concentrate input passage of the double tip assembly includes a check valve to prevent flow of concentrate or water or washing solution from the double tip assembly toward the concentrate reservoir.

15. A method of retrofitting existing vehicle washing systems to accommodate highly concentrated vehicle washing chemicals, the method comprising the following steps:

providing a concentrate reservoir containing concentrate;

providing a double tip assembly with a concentrate input passage and a washing solution input passage, the concentrate input passage and the washing solution input passage being connected to an output passage through which a mixture of concentrate and a washing solution passes;

connecting a conduit between the concentrate reservoir and the concentrate input passage of the double tip assembly;

connecting a conduit between a pre-existing washing solution tank and the washing solution input passage of the double tip assembly;

connecting the common output passage of the double tip assembly to a pre-mix input passage of a three-way valve, the three-way valve already being in place and including a main water supply input passage, the pre-mix input passage and the main water supply input passage being connected to a washing solution output passage through which a mixture of concentrate, washing solution, and water from the main water supply passes to the washing solution tank;

the washing solution tank being previously connected to a pump whereby a portion of the washing solution in the washing solution tank is pumped from the washing solution tank by the pump to a spray arch where the portion of washing solution from the washing solution tank is mixed with water from the main water supply before it is applied to vehicles.

16. A system for washing vehicles comprising:

a concentrate reservoir containing concentrate;

a mixing connection including a main water supply input passage, a concentrate input passage, and a stock solution output passage, the main water supply input passage being connected by a water conduit to a main water supply, the concentrate input passage being in fluid communication with the concentrate reservoir, and the stock solution output passage being in fluid communication with the main water supply input passage and the concentrate input passage such that flow of water through the main water input passage draws concentrate from the concentrate reservoir whereby a mixture of water from the main water supply and concentrate passes through the stock solution output passage;

the stock solution output passage being in fluid communication with a stock solution tank, the stock solution tank being connected to a pump, concentrate and water from the main water supply forming a stock solution that is pumped from the stock solution tank to a spray arch, the spray arch also being connected to the main water supply, the stock solution being mixed with additional water from the main water supply in the spray arch before passing out of the spray arch through spray nozzles disposed in the spray arch.

17. The system for washing vehicles of claim 16 wherein:

the water conduit includes a valve for controlling flow of water through the water conduit, the valve being movable from a closed position wherein water does not flow from the main water supply to the main water supply input passage to an open position wherein water flows from the main water supply to the main water supply input passage.

18. The system for washing vehicles of claim 17 further comprising:

a float coupled to the valve, the float floating on the surface of the stock solution, the float moving the valve to the closed position when the stock solution reaches a predetermined level in the stock solution tank.

19. A method of retrofitting existing vehicle washing systems to accommodate highly concentrated vehicle washing chemicals, the method comprising the following steps:

providing a concentrate reservoir containing concentrate;

providing a mixing connection including a main water supply input passage, a concentrate input passage, and a stock solution output passage, the stock solution output passage being in fluid communication with the main water supply input passage and the concentrate input passage;

connecting the main water supply input passage of the mixing connection to a water conduit of a proportioning and dispensing system, the proportioning and dispensing system already being in place, the water conduit being connected to a main water supply;

connecting the concentrate input passage to the concentrate reservoir; and connecting the stock solution output passage to a pre-existing stock solution tank, the stock solution tank being connected to a pump;

whereby concentrate and water from the main water supply form a stock solution that is pumped from the stock solution tank to a spray arch, the spray arch also being connected to the main water supply, the stock solution being mixed with additional water from the main water supply in the spray arch before passing out of the spray arch through spray nozzles disposed in the spray arch.

* * * * *